Patented July 8, 1947

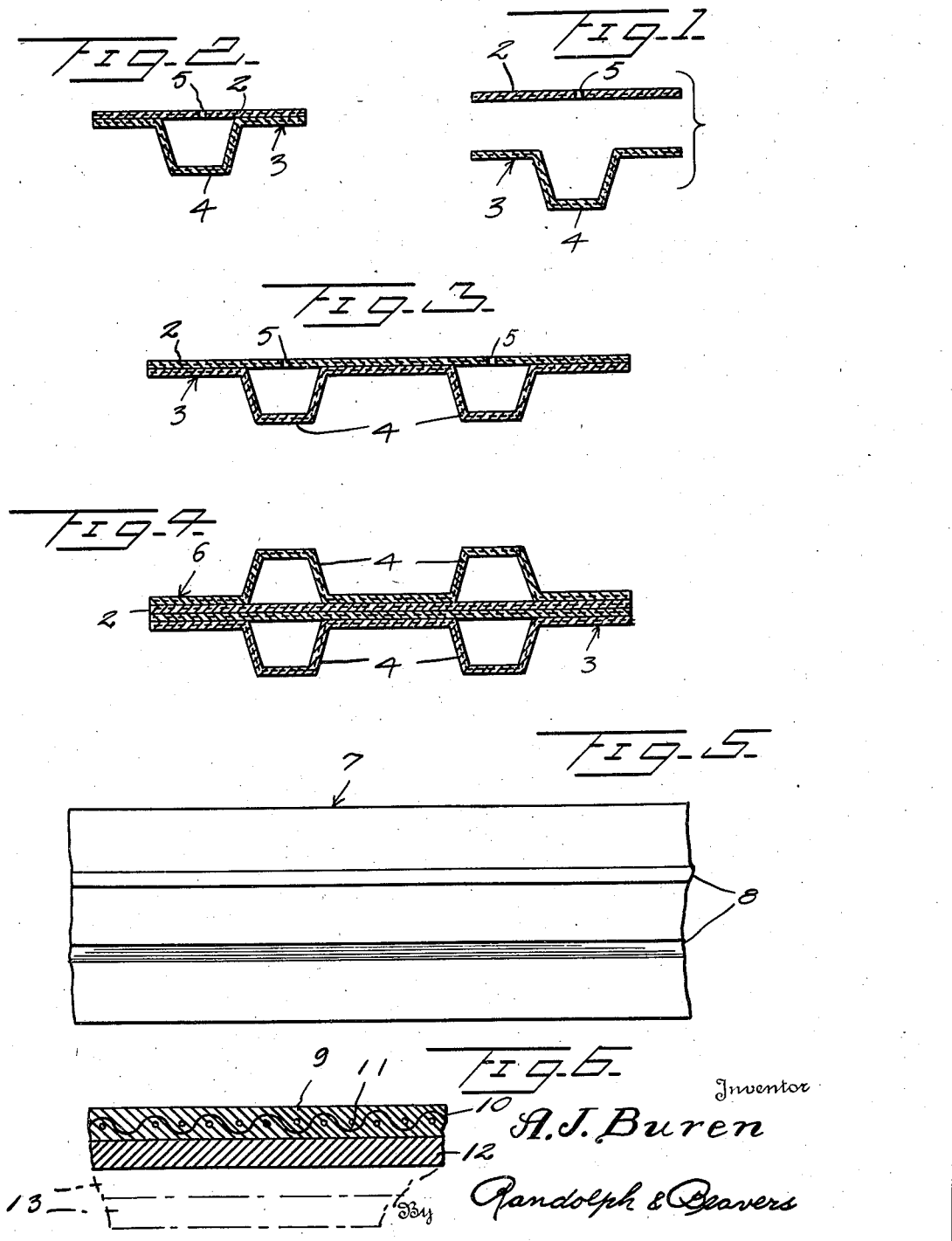

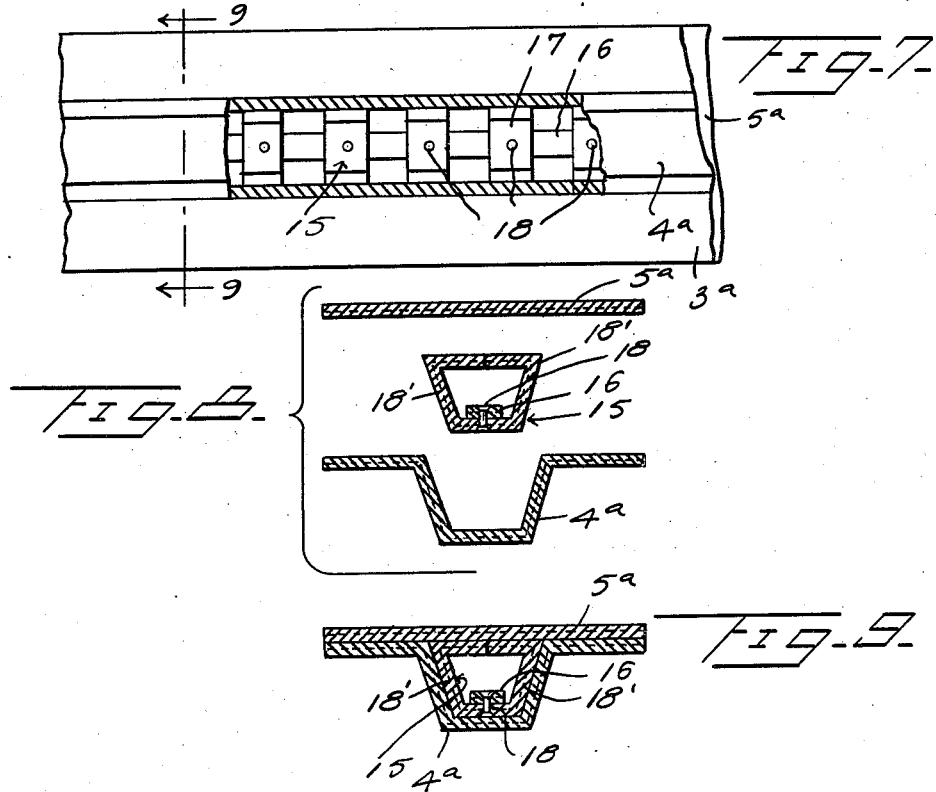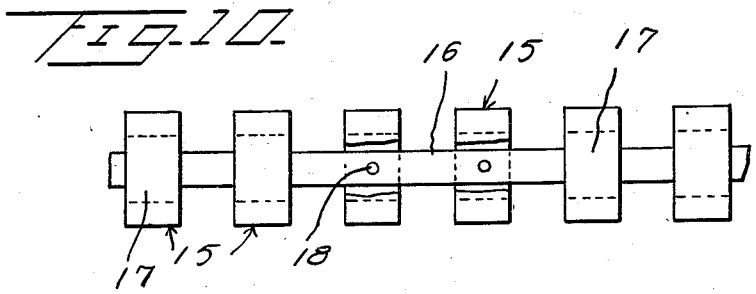

2,423,579

UNITED STATES PATENT OFFICE 2,423,579

CORRUGATED BELTING

Asa J. Buren, Cullom, Ill.

Application February 2, 1945, Serial No. 575,851

2 Claims. (Cl. 74—233)

This present invention relates to the construction of corrugated belting, either of the driving or conveying or endless track types.

The corrugations may be hollow or solid. If the corrugations are hollow and ventilated the belting will be air cooled. The corrugations will increase the grip on the pulley as the load increases. My belting combines all the good qualities of the flat and V-belt types. The corrugations may run lengthwise or crosswise of the belting and have flat tops or bottoms. The corrugations prevent these belts from slipping off from the pulleys and need not be as tight as ordinary belts which wear out in a shorter time.

The material of which my belting is made may be rubber and/or fabric, leather, canvas, cords, etc.

If leather is used for my belting, the plys may be sewn or cemented together. Leather could also be used for building up solid ribs characteristic of corrugations.

The belt embodying my invention may be joined together at the ends by vulcanizing or they may be spliced together at the ends by conventional fasteners. If the ends of this air cooled belting is made endless by vulcanizing, small vent holes must be made in the flat ply directly above the air channel to provide circulation of air.

In the accompanying drawings which illustrate examples of the types of belting embodying my invention:

Figure 1 is a transverse section of two plys of rubber and fabric one flat and the other corrugated prior to joining them by vulcanization;

Figure 2 is a transverse sectional view of the complete belt;

Figure 3 is a transverse section through a finished belt with two corrugations;

Figure 4 is a transverse section of a belt with a corrugated ply on either side and two corrugations;

Figure 5 is a plan view of a belt with one corrugation;

Figure 6 is a section through a ply consisting of a lower sheet of rubber and an upper rubber and fabric sheet.

Figure 7 is a fragmentary plan view of another modified form of the invention.

Figure 8 is an exploded view thereof.

Figure 9 is a cross section taken on the line 9—9 of Fig. 7, and

Figure 10 is a plan view of the reinforcing means.

In Figure 1 numeral 2 denotes a flat strip of a rubber and fabric ply which is constructed by vulcanizing together a rubber saturated fabric and a thin sheet of rubber. A corrugated ply 3 made of the same material as the flat ply has an outer surface of the bottom of a corrugation 4 thereof which is flat to afford a better grip on a pulley of roller, not shown. The flat and corrugated plys are joined together by vulcanizing (Figure 2). When the ends of the belt are joined by vulcanization, air is trapped in the space and ventilation is provided by air holes 5 in the flat ply.

In Figure 3 appears a transverse section of a belt having two corrugations 4 instead of only one as the belt of Figure 2. The corrugations may be spaced to suit the construction of a grooved pulley. Such a belt may also be used on plain cylindrical pulleys or on multiple V-belt wheels or pulleys.

The belts of Figures 1, 2, 3 with corrugations on one side only may be used for elevators, since lugs or cups may be fastened to the flat side for conveying grains, straw, gravel, dirt, etc.

Air holes 5 are provided in the portion of the flat sheet overlying the air channel.

Figure 4 shows a transverse section of a belt consisting of three plys, the two outer ones 3 and 6 being corrugated and the intermediate one 2 being flat. This type of belt may be used for the same purpose for which the belts with one corrugated face (Figures 1-3) is used and is especially useful in driving multiple pulleys, rolls, etc., in a straight or crossed drive. Owing to the fact that it has corrugations on either side this type of belt renders excellent service when interlaced between rolls of which the odd numbered ones are driven in one direction while the even numbered ones are driven in the opposite direction.

Figure 5 shows a belt 7 with solid ribs 8 or corrugations eminently fit for heavy work.

Corrugated belts made in large and thick ply sizes can be used as endless tracks on tractors and trucks in place of the steel tracks now in use on those vehicles. These belts are also adapted for use on the type of vehicles referred to in cooperation with pneumatic tires having a grooved tread and would permit high speed on roads and make for good traction on mud roads.

These belts used as endless tracks would permit the vehicle equipped with them to operate in fields of soft ground without packing the ground and without slippage.

In Figure 6 is shown a section of a belting ply consisting of an upper layer 9 of rubber in which a fabric 10 of wave shape is embedded, also reinforcing wires or cords 11, and a lower layer 12 of rubber and additional layers 13, if desired.

A further form of the invention is shown in Figures 7 to 10 inclusive wherein reference character 5a denotes a belt on which a strip material 3a is suitably secured as in the manner of the form of the invention as shown in Figure 2, with its intermediate longitudinal portion outstanding to define a corrugation 4a. This form of the invention is provided with an internal strengthening assembly generally referred to by numeral 15, the same consisting of an elongated strip 16 of rubber, fabric or combination of these materials, the same having cross members 17 riveted or otherwise secured as at 18 thereto. These cross members or ribs 17 are of any desired material and are shaped to conform with the interior of the corrugation 4a, as shown in Figure 9. These ribs are in fact strips disposed over the outer side of the strip 16 and have side portions 18', 18' which extend along the inner sides of the corrugation 4a and have their end portions disposed inwardly to abut each other, as substantially shown in Figure 9, where they bear against the belt 5a.

This assembly 15 is inserted inside of the corrugation 4a before the latter is applied to the belt 5a and properly secured in place.

A corrugation fitted with this reinforcing means will be definitely more durable and wear resisting than the other forms which are intended for lighter duty. These reinforcing assemblies are especially desired for larger size belts.

While the drawings illustrate the corrugations as extending lengthwise of the belting, the former may also extend transversely or both longitudinally and transversely of the latter.

While the foregoing specification sets forth the invention in specific terms, it is to be understood that numerous changes in the shape, size and materials may be resorted to without departing from the spirit and scope of the invention as claimed hereinafter.

Having thus described my invention, what I claim as new is:

1. A belt comprising an elongated belt element provided with a hollow corrugation thereon and a reinforcing element disposed in the said corrugation, said reinforcing element consisting of an elongated strip provided with cross members disposed to brace the side walls and outer portion of the corrugation.

2. A belt comprising an elongated belt element provided with a hollow corrugation thereon and a reinforcing element disposed in the said corrugation, said reinforcing element consisting of an elongated strip provided with cross members disposed to brace the side walls and outer portion of the corrugation and to bear against the bed of the corrugation.

ASA J. BUREN.

REFERENCES CITED

The following references are of record in the file of this patent:

UNITED STATES PATENTS

| Number | Name | Date |
|---|---|---|
| 761,054 | Blodgett | May 24, 1904 |
| 590,461 | Parker | Sept. 21, 1897 |
| 1,100,654 | Church | June 16, 1914 |
| 1,928,869 | Roderwald | Oct. 3, 1933 |
| 1,729,329 | Chilton | Sept. 24, 1929 |
| 2,163,347 | Nassimbene | June 20, 1939 |
| 2,189,049 | Ungar | Feb. 6, 1940 |

FOREIGN PATENTS

| Number | Country | Date |
|---|---|---|
| 89,942 | Germany | Jan. 14, 1897 |
| 14,174 | Great Britain | 1904 |